US012077051B2

(12) United States Patent
Kucab

(10) Patent No.: US 12,077,051 B2
(45) Date of Patent: Sep. 3, 2024

(54) ELECTRIC VEHICLE WITH SOLID AXLE AND HUB MOTORS

(71) Applicant: FORD GLOBAL TECHNOLOGIES, LLC, Dearborn, MI (US)

(72) Inventor: Gregory Kucab, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 603 days.

(21) Appl. No.: 17/394,606

(22) Filed: Aug. 5, 2021

(65) Prior Publication Data
US 2023/0042713 A1  Feb. 9, 2023

(51) Int. Cl.
B60K 7/00    (2006.01)
B60B 35/16   (2006.01)
B60K 1/02    (2006.01)
B60K 1/04    (2019.01)
B60K 17/02   (2006.01)

(52) U.S. Cl.
CPC ............ *B60K 7/0007* (2013.01); *B60B 35/16* (2013.01); *B60K 1/02* (2013.01); *B60K 1/04* (2013.01); *B60K 17/02* (2013.01); *B60K 2007/0038* (2013.01)

(58) Field of Classification Search
CPC .......... B60K 1/02; B60K 1/04; B60K 7/0007; B60K 17/02; B60K 2007/0038; B60K 2007/0092; B60B 35/16
See application file for complete search history.

(56) References Cited

U.S. PATENT DOCUMENTS 10,518,627 B2   12/2019  Nagpal et al.
2009/0242289 A1*  10/2009  Murty ................. B60W 10/08
                                                             475/5
2014/0121870 A1*  5/2014  Lee .................... B60W 30/16
                                                             477/3
2021/0155219 A1*  5/2021  Alcantar ............. B60W 10/08

FOREIGN PATENT DOCUMENTS

CN    109094363 A     12/2018
CN    110588366 A     12/2019
CN    213043543 U      4/2021
DE     19617165 A1    10/1997
DE    102011005625 A1  9/2012
EP     2531364 B1      3/2019

* cited by examiner

Primary Examiner — S. Joseph Morano
Assistant Examiner — Emily G. Castonguay
(74) Attorney, Agent, or Firm — Vincent Mastrogiacomo; Brooks Kushman P.C.

(57) ABSTRACT

An electrified vehicle axle includes a first wheel assembly having a first electric machine configured to power a first wheel and a second wheel assembly having a second electric machine configured to power a second wheel. A beam has a first end connected to the first wheel assembly and second end connected to the second wheel assembly. An axle shaft is supported for rotation within a hollow center of the beam and is configured to transfer torque between the first and second electric machines. At least one clutch selectively couples at least one of the electric machines to the axle shaft.

20 Claims, 3 Drawing Sheets

ELECTRIC VEHICLE WITH SOLID AXLE AND HUB MOTORS

TECHNICAL FIELD

The present disclosure relates to electric vehicles having a solid axle.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power. An all-wheel-drive electric vehicle may include front and rear electric axles independently powered by dedicated electric machines.

SUMMARY

According to one embodiment, an electrified vehicle axle includes first and second wheel assemblies each having an electric machine, a wheel powered by the electric machine, and a clutch. A beam interconnects the first and second wheel assemblies. An axle shaft is supported for rotation within a hollow center of the beam. The axle shaft has a first end connected to the clutch of the first wheel assembly and a second end connected to the clutch of the second wheel assembly, wherein the clutches are configured to selectively couple the electric machines to each other.

According to another embodiment, an electrified vehicle axle includes a first wheel assembly having a first electric machine configured to power a first wheel and a second wheel assembly having a second electric machine configured to power a second wheel. A beam has a first end connected to the first wheel assembly and second end connected to the second wheel assembly. An axle shaft is supported for rotation within a hollow center of the beam and is configured to transfer torque between the first and second electric machines. At least one clutch selectively couples at least one of the electric machines to the axle shaft.

According to another embodiment, an electric vehicle includes a traction battery and a solid axle suspension system. The solid axle includes a beam rigidly connected between first and second wheel knuckles and first and second hub motors supported by the first and second wheel knuckles and electrically connected to the traction battery. An axle shaft is supported for rotation within the beam and is configured to carry torque from one of the hub motors to the other of the hub motors. A clutch selectively couples one of the hub motors to the axle shaft.

DETAILED DESCRIPTION

Figure 1:
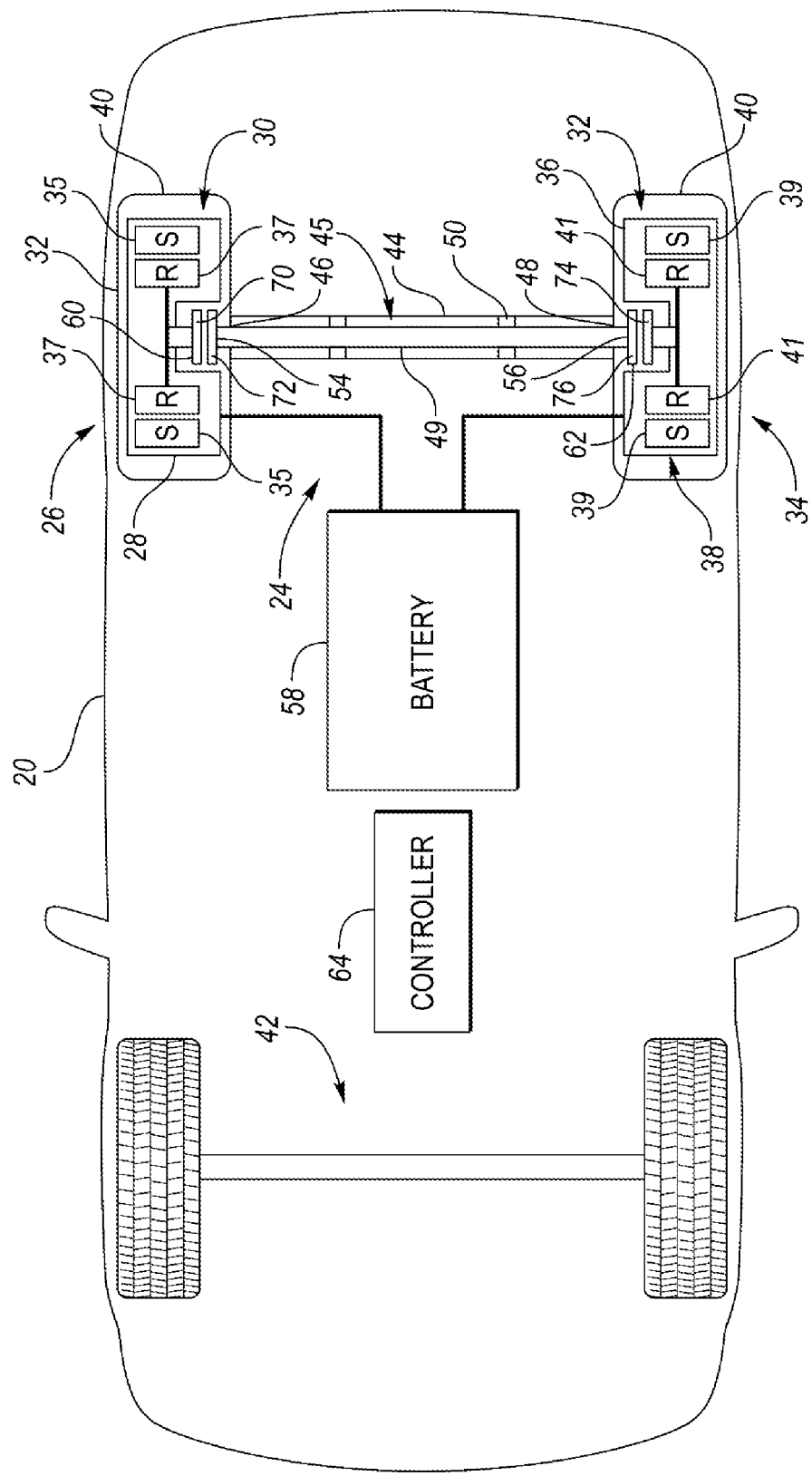
FIG. 1 is a schematic diagram of an electric vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis or centerline is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, coupled, attached, etc., refer to directly or indirectly connected, coupled, attached, etc., unless otherwise indicated explicitly or by context.

Referring to FIG. 1, an electrified vehicle 20 is illustrated according to an embodiment of the present disclosure. FIG. 1 illustrates representative relationships among the components. Physical placement and orientation of the components within the vehicle may vary. The vehicle 20 may be a rear-wheel drive vehicle (as shown), front-wheel drive vehicle, or an all-wheel-drive vehicle. The vehicle includes a rear axle 24 that is powered by one or more electric machines. In the illustrated embodiment, the vehicle 20 includes a hub motor, e.g., an electric machine mounted within the wheel assembly, at each driven wheel. For example, the electrified axle 24 includes a first wheel assembly 26 having a support structure 28, such as a knuckle, an electric machine 30 configured to drive a wheel hub (not shown), and a wheel 32 mounted to the wheel hub. The electric machine 30 includes a stator 35 and a rotor 37. The stator 35 is supported by the support structure 28 and is stationary relative to the wheel 32. The rotor 37 is fixedly coupled to the wheel 32. A group of rotating elements are fixedly coupled to one another if they are constrained to rotate as a unit in all operating conditions. Rotating elements can be fixedly coupled by spline connections, gear mesh, welding, press fitting, machining from a common solid, fasteners, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a clutch (or the like) when the clutch constrains them to rotate as a unit whenever it is fully engaged and they are free to rotate at distinct, unrelated speeds in at least some other operating condition. Two elements are coupled if they are either fixedly coupled or selectively coupled.

The electrified axle 24 also includes a second wheel assembly 34 having a support structure 36, such as a knuckle, an electric machine 38 configured to drive a wheel hub, and a wheel 40 mounted to the wheel hub. The electric machine 38 includes a stator 39 and a rotor 41. The stator 39 is supported by the support structure 36 and is stationary relative to the wheel 40. The rotor 41 is fixedly coupled to the wheel 40. While the electric machines are shown with the rotors being supported for rotation within the stators, this placement may be switched in other embodiments. As shown, the front axle 42 is unpowered, however, in other embodiments, the front axle may also be an electrified axle that includes hub motors or other electrified arrangement or a conventional powertrain.

The electric machines 30, 38 are electrically connected to a high-voltage battery 58. Power electronics (not shown) condition direct current (DC) power provided by the battery 58 to the requirements of the electric machines 30, 38. For example, the power electronics may provide three-phase AC to the electric machines. The power electronics are also configured to convert AC power generated by the electric machines to DC power to recharge the battery 58 such as during regenerative braking.

The rear axle 24 may have a solid axle dependent suspension system in which the wheel assemblies 26 and 34 are rigidly connected via a beam 44. The beam 44 includes a first end 46 attached to the support structure 28 of the first wheel assembly 26 and a second end 48 that is attached to the support structure 36 of the second wheel assembly 34. The beam 44 may have a hollow tubular structure that defines an interior 45. An axle shaft 49 is supported for rotation within the beam 44 such as by one or more bearings 50. The bearings 50 may have an outer race fixed to the beam 44 and an inner race fixed to the axle shaft 49. Roller elements, such as ball bearings or needle bearings, may be disposed between the inner and outer races to provide low friction rotation and support the axle shaft 48.

Clutches 60 and 62 selectively couple the wheel assemblies 26, 34 to the axle shaft 49. The clutches 60, 62 may be packaged as part of the wheel assemblies. The clutch 60 is associated with the wheel assembly 26 and selectively couples a first end 54 of the shaft 49 to the electric machine 30. The clutch 60 may selectively couple the first end 54 to the rotor 37. The clutch 62 is associated with the wheel assembly 34 and selectively couples a second end 56 of the shaft 49 to the electric machine 38. The clutch 62 may selectively couple the second end 56 to the rotor 41. The clutches may operate in a variety of states such as a fully engaged state (locked) in which the clutch rotationally couples the electric machine to the axle shaft 48 without slip, a fully disengaged state (open) in which the electric machine and the axle shaft rotate independently of each other, and a partially engaged state (slipping) in which clutch torque capacity is present with relative slip between the electric machine and the axle shaft. In some embodiments, the clutches may be disconnect clutches.

The clutch 60 may include a first component or side 70 fixedly coupled to the electric machine 30 and a second component or side 72 fixedly coupled to the axle shaft 49. A clutching mechanism (not shown) is configured to selectively couple the first component 70 to the second component 72 to engage the clutch 60. The clutch 62 may include a first component or side 74 fixedly coupled to the electric machine 38 and a second component or side 76 to the axle shaft 49. A clutching mechanism (not shown) is configured to selectively couple the first component 74 to the second component 76 to engage the clutch 62.

The clutches 60, 62 may be controlled by a controller 64. Each of the clutches may have an actuator arrangement that is in electric communication with the controller 64. The actuator arrangement is configured to receive signals from the controller to actuate the clutch to a desired position or state such as fully disengaged, fully engaged, or partially engaged depending upon driving conditions and the design of the clutch. The actuator arrangement and clutching mechanism may be hydraulic or electromechanical.

The electrified vehicle axle 24 may have a plurality of different modes based on the state of the clutches 60, 62. For example, in a normal or baseline mode, one or both of the clutches 60 and 62 may be open permitting independent operation of the hub motors 30 and 38. Independent operation of the hub motors 30, 38 permits speed difference between the left and right wheels to facilitate cornering and/or to provide torque vectoring. The axle 24 may also have a locked mode in which both of the clutches 60 and 62 are fully engaged. In this mode, the clutches cooperate to rotationally lock the wheel assemblies 26 and 34 similar to a locking differential. This mode may be useful during low traction situations such as off-road driving or during inclement weather, e.g., snow/ice. By coupling the two electric machines to each other via engagement of the clutches and the axle shaft, torque from the hub motor associated with low traction can be transferred to the wheel assembly with traction to propel the vehicle. In the illustrated embodiment, up to 100 percent of a hub motor's torque can be sent to the other hub motor to take advantage of a single wheel having traction. This may be particularly useful when one wheel is off the ground such as during rock crawling. In some embodiments, the axle 24 may have a third operating mode in which both of the clutches are slipping.

Figure 2:
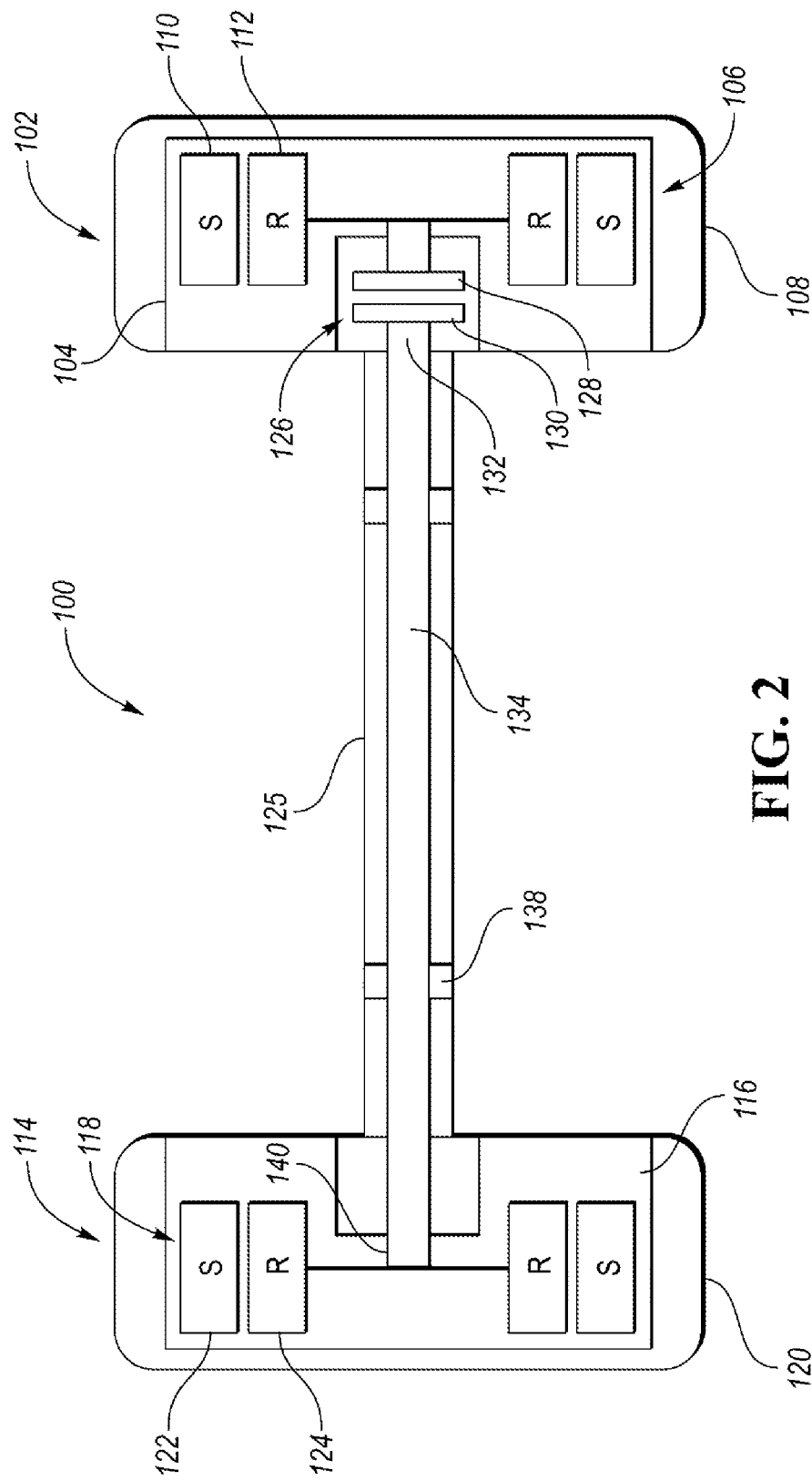
FIG. 2 is a schematic diagram of an axle of the electric vehicle according to an alternative embodiment.

Referring to FIG. 2, an electrified solid axle 100 according to an alternative embodiment may only include a single clutch rather than a pair of clutches as discussed above. The solid axle may be a front axle or a rear axle. The electrified axle 100 includes a first wheel assembly 102 having a support structure 104, such as a knuckle, an electric machine 106 configured to drive a wheel hub, and a wheel 108 mounted to the wheel hub. The electric machine 106 includes a stator 110 and a rotor 112 as described above. The electrified axle 100 also includes a second wheel assembly 114 having a support structure 116, such as a knuckle, an electric machine 118 configured to drive a wheel hub, and a wheel 120 mounted to the wheel hub. The electric machine 118 includes a stator 122 and a rotor 124. The wheel hub assemblies 102, 114 are rigidly interconnected by a transverse beam 125 as described above.

In this embodiment, only a single clutch 126 is employed rather than the pair of clutches as described above. In the illustrated embodiment, the clutch 126 is associated with the wheel assembly 102, however, the clutch 126 may be located at the other wheel assembly 114. The clutch 126 may be structurally similar to any of the above described clutches. For example, the clutch 126 may have a first side or component 128 fixedly coupled to the rotor 112 and a second side or component 130 fixedly coupled to an end 132 of the axle shaft 134, which is supported for rotation within the beam 125 by one or more bearings 138 as described above. The other end 140 of the shaft 134 may be fixedly coupled to the rotor 124 of the electric machine 116. For example, the end 140 may be splined to a hub of the rotor or to an intermediary component that is rotatably fixed relative to the rotor.

The axle 100 may operate similarly to the axle 24 by modifying an engagement state of the clutch 126. For example, opening the clutch 126 permits independent operation of the electric machines 106 and 118, and fully engaging the clutch 126 rotationally couples the wheels 108 and 120 for synchronized rotation as discussed above.

Figure 3:
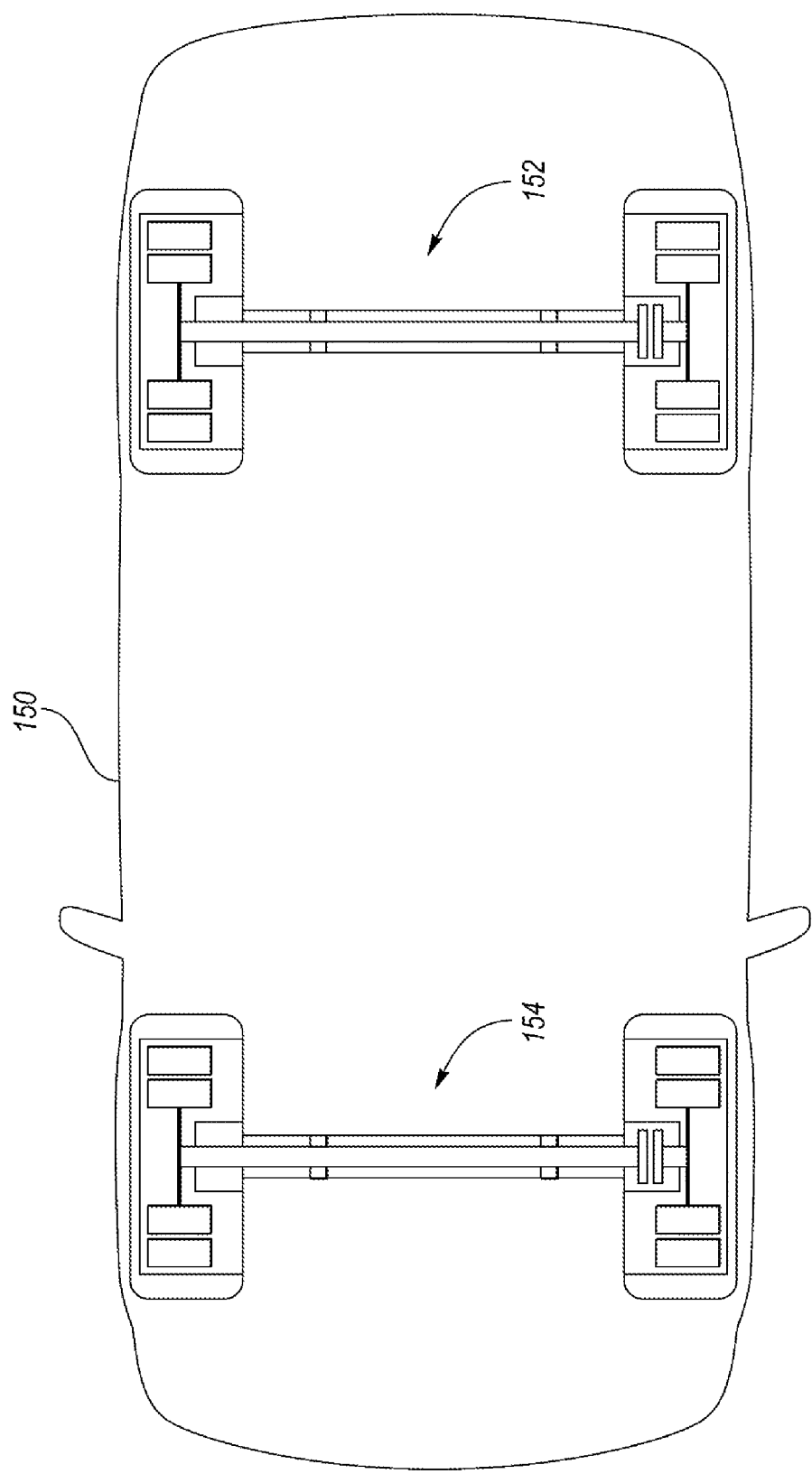
FIG. 3 is a schematic diagram of another electric vehicle.

FIG. 3 illustrates an all-wheel drive vehicle 150 having a pair of electrified solid axles 152 and 154, each with hub motors. The axles 152 and 154 may be according to any of the about described embodiments. In the illustrated example, the axles 152 and 154 are single-clutch axles, like axle 100. In other embodiments, the axles 152 and 154 may be dual-clutch axles, like axle 24. In another embodiment, the axle 152 may be a single-clutch axle, like axle 100, and the axle 154 may be. In yet another embodiment, the axle 152 may be a dual-clutch axle, like axle 24, and the axle 154 may be a single-clutch axle, like axle 100.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle axle comprising:
   first and second wheel assemblies each including an electric machine, a wheel powered by the electric machine, and a clutch;
   a beam interconnecting the first and second wheel assemblies; and
   an axle shaft supported for rotation within a hollow center of the beam, the axle shaft having a first end connected to the clutch of the first wheel assembly and a second end connected to the clutch of the second wheel assembly, wherein the clutches are configured to selectively couple the electric machines to each other.

2. The electrified vehicle axle of claim 1, wherein each of the clutches includes a first component fixedly coupled to a rotor of an associated one of the electric machines and a second component fixedly coupled to an associated one of the first and second ends.

3. The electrified vehicle axle of claim 2, wherein the second components of the clutches are fixedly coupled to each other via the axle shaft.

4. The electrified vehicle axle of claim 1, wherein the electrified vehicle axle has a first mode in which both of the clutches are fully engaged to synchronize rotation of the wheels and a second mode in which at least one of the clutches is disengaged to permit relative rotation between the wheels.

5. The electrified vehicle axle of claim 4, wherein the electrified vehicle axle has a third mode in which both of the clutches are partially engaged.

6. The electrified vehicle axle of claim 1, wherein each of the electric machines includes a stator and a rotor, wherein the wheels are fixed to the rotors and the clutches selectively couple the first and second ends to the rotors.

7. The electrified vehicle axle of claim 1 further comprising at least one bearing disposed within the hollow center and supporting the axle shaft.

8. The electrified vehicle axle of claim 1, wherein the beam has a first end connected to the first wheel assembly and a second end connected to the second wheel assembly.

9. An electrified vehicle axle comprising:
   a first wheel assembly including a first electric machine configured to power a first wheel;
   a second wheel assembly including a second electric machine configured to power a second wheel;
   a beam having a first end connected to the first wheel assembly and second end connected to the second wheel assembly;
   an axle shaft supported for rotation within a hollow center of the beam and configured to transfer torque between the first and second electric machines; and
   at least one clutch selectively coupling at least one of the electric machines to the axle shaft.

10. The electrified vehicle axle of claim 9, wherein the at least one clutch is a single clutch that selectively couples a first end of the axle shaft to the first electric machine, and wherein a second end of the axle shaft is fixedly coupled to the second electric machine.

11. The electrified vehicle axle of claim 9, wherein the at least one clutch includes a first clutch that selectively couples the axle shaft to the first electric machine.

12. The electrified vehicle axle of claim 11, wherein the at least one clutch further includes a second clutch that selectively couples the axle shaft to the second electric machine.

13. The electrified vehicle axle of claim 12, wherein the axle shaft has a first end fixedly coupled to the first clutch and a second end fixedly coupled to the second clutch.

14. The electrified vehicle axle of claim 9, wherein the electrified vehicle axle has a first mode in which the at least one clutch is fully engaged to synchronize rotation of the first and second wheels and a second mode in which the at least one clutch is disengaged to permit relative rotation between the first and second wheels.

15. The electrified vehicle axle of claim 9 further comprising at least one bearing disposed within the hollow center and supporting the axle shaft.

16. An electric vehicle comprising:
   a traction battery; and
   a solid axle including:
      a beam rigidly connected between first and second wheel knuckles,
      first and second hub motors supported by the first and second wheel knuckles and electrically connected to the traction battery,
      an axle shaft supported for rotation within the beam and configured to carry torque from one of the hub motors to the other of the hub motors, and
      a clutch selectively coupling one of the hub motors to the axle shaft.

17. The electric vehicle of claim 16, wherein the solid axle further includes a second clutch selectively coupling the other of the hub motors to the axle shaft.

18. The electric vehicle of claim 17, wherein the axle shaft includes a first end connected to the first clutch and a second end connected to the second clutch.

19. The electric vehicle of claim 16, wherein the axle shaft includes a first end selectively coupled to the first hub motor by the clutch and a second end fixedly coupled to the second hub motor.

20. The electric vehicle of claim 16, wherein the clutch includes a first component fixedly coupled to a rotor of the first hub motor and a second component fixedly coupled to the axle shaft.

\* \* \* \* \*